(12) United States Patent
Masuda et al.

(10) Patent No.: US 6,653,871 B2
(45) Date of Patent: Nov. 25, 2003

(54) METHOD OF AND CIRCUIT FOR CONTROLLING A CLOCK

(75) Inventors: Masashi Masuda, Kawasaki (JP); Hiroyoshi Yamashita, Kawasaki (JP); Akio Hara, Kawasaki (JP); Kohji Kitagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/073,490

(22) Filed: Feb. 13, 2002

(65) Prior Publication Data

US 2003/0006807 A1 Jan. 9, 2003

(30) Foreign Application Priority Data

Jul. 5, 2001 (JP) ........................................ 2001-204947

(51) Int. Cl.[7] .............................................. H03K 17/00
(52) U.S. Cl. ........................................ 327/99; 327/291
(58) Field of Search ..................... 327/99, 141, 172, 327/291, 292, 293, 295, 407

(56) References Cited

U.S. PATENT DOCUMENTS 5,625,311 A * 4/1997 Nakatsu ...................... 327/293
6,084,441 A * 7/2000 Kawai ........................... 327/99
6,515,519 B1 * 2/2003 Miyazaki et al. ........... 327/105

FOREIGN PATENT DOCUMENTS

| JP | 10-011415 | 1/1998 |
|---|---|---|
| JP | 10-031531 | 2/1998 |
| JP | 11-003131 | 1/1999 |

* cited by examiner

*Primary Examiner*—My-Trang Nuton
(74) *Attorney, Agent, or Firm*—Staas & Halsey LLP

(57) ABSTRACT

This invention relates to switching-over to a higher speed clock from a lower speed clock. The switching-over of the clock is performed before, after, or simultaneously to a transition to a sleep mode is carried out. After the switching-over of the clock is performed, if oscillation of the high speed clock and an internal voltage are stabilized, it is returned to a normal mode from the sleep mode.

20 Claims, 17 Drawing Sheets

METHOD OF AND CIRCUIT FOR CONTROLLING A CLOCK

FIELD OF THE INVENTION

The present invention relates to a method of and a circuit controlling switching of a clock to be used in a semiconductor integrated circuit such as a microcontroller or the like.

BACKGROUND OF THE INVENTION

In recent years, a clock in which original oscillation is multiplying by PLL is used in a microcontroller or the like, and as a result the high speed operation is realized. In such a situation, a high clock speed is required, but on the other hand a low speed operation is also required in order to establish low dissipation power operation. Therefore, the clock speed is switched according to objects, but it is necessary to carry out switching between a low clock speed and a high clock speed smoothly.

FIG. 1 is a block diagram showing a main section of the microcontroller into which a conventional clock control circuit is mounted. This microcontroller 1 is constituted so that a C-unit 2 for controlling switching of a clock, an E-unit 11 as a CPU core and a T-unit 12 for controlling an external bus interface are connected to an internal bus 13.

The C-unit 2 has a bisecting divider (½) 21 for bisecting an external oscillation input (X0), a PLL 22 for multiplying the external oscillation input (X0), and a selector 23 for selecting any one of an output clock of the bisecting divider 21 and an output clock of the PLL 22. The selector 23 selects a clock according to a stored value of a clock source switching register 24. Moreover, the C-unit 2 has a CLKB-use nb divider (1/nb) 25 for dividing the output clock of the selector 23 and outputting a clock CLKB for the CPU core, a CLKT-use nt divider (1/nt) 26 for outputting a clock CLKT for the external bus interface, and a CLKP-use np divider (1/np) 27 for outputting a clock CLKP for a peripheral circuit. Dividing ratios of the CLKB-use nb divider (1/nb) 25, the CLKT-use nt divider (1/nt) 26 and the CLKP-use np divider (1/np) 27 are set according to stored values of a dividing set register 28.

After reset of the microcontroller 1 having the above structure is released, the microcontroller 1 is operated with bisection of the external oscillation input (X0) by the bisecting divider 21. While it is being-operated with the bisection, various initializing operations are performed. After a multiplying rate of the PLL 22 is set and oscillation of the PLL 22 is stabilized, a dividing ratio is set in the dividing set register 28 so that a target frequency is obtained. Thereafter, in order to switch a supply clock to the internal circuit from bisection of the external oscillation input (X0) to a PLL clock, "1" is written into the clock source switching register 24 so that the PLL 22 is enabled. As a result, the internal clock of the microcontroller 1 is changed from a low speed into a high speed, and thus the microcontroller 1 is operated at high speed.

However, in the microcontroller 1 into which the above conventional clock control circuit is mounted, as shown in FIG. 2, when the clock source is switched from a low speed clock (for example, 2 MHz) into a high speed clock (for example, 64 MHz), dissipation current Icc of the internal circuit increases abruptly from 10 mA to 300 mA, for example. For this reason, a great voltage drop occurs, and an internal voltage Vcc is occasionally less than a guaranteed range. As a result, there arises a problem of a malfunction.

SUMMARY OF THE INVENTION

It is an object of the present invention to provide a method of and circuit for controlling clock in which it is possible to reduce a voltage fluctuation when a low speed clock is changed into a high speed clock and prevents an internal voltage from being less than a guaranteed range so as to be capable of avoiding occurrence of a malfunction.

In the clock control circuit according to one aspect of the present invention switching-over to a higher speed clock from a lower speed clock is carried out. The switching-over of the clock is performed before, after, or simultaneously to a transition to a sleep mode is carried out. After the switching-over of the clock is performed, if oscillation of the high speed clock and an internal voltage are stabilized, it is returned to a normal mode from the sleep mode.

According to the above-mentioned aspect of this invention, when the clock is switched from low speed clock into high speed clock, the clock switching candidate device transitions to the sleep mode so that an internal resistance becomes great, and a degree of a voltage drop with respect to a time axis is reduced. Therefore, a guaranteed voltage can be maintained until the internal voltage is returned. Moreover, the candidate device transitions to the sleep mode so that a state at the time of the transition to the sleep mode is maintained in the clock switching candidate device.

Moreover, when a plurality of candidate devices in which the sleep mode is to be released exist, respective sleep signals to the plural candidate devices are released not simultaneously but gradationally. As a result, since a change in the internal resistance at the time of releasing the sleep signals becomes small, a degree of a change in a dissipation current becomes small, and a drop of the internal voltage can be slackened. Therefore, the guaranteed voltage can be maintained until the internal voltage is returned.

In addition, when a plurality of internal clocks exist, the switching of the clock source is carried out in every internal clock. As a result, since the plural internal clocks are switched into high speed clock not simultaneously but successively, a change width of the dissipation current is reduced, and the drop of the internal voltage can be slackened.

Moreover, when a clock source is switched from low speed clock into high speed clock, a clock speed is heightened gradationally. Since the clock speed becomes faster gradually, a change width of a dissipation current is reduced, and a drop of an internal voltage can be slackened. Moreover, the present invention may be constituted so that every time when the clock speed is heightened at one stage, transition to a sleep mode is once carried out, and the clock speed is switched into a faster speed at one more stage after returning to a normal mode. As a result, due to the transition to the sleep mode, as mentioned above, the guaranteed voltage can be maintained until the internal voltage is returned, and a state at the time of the transition to the sleep mode can be maintained.

Other objects and features of this invention will become apparent from the following description with reference to the accompanying drawings.

DETAILED DESCRIPTION

Figure 1:
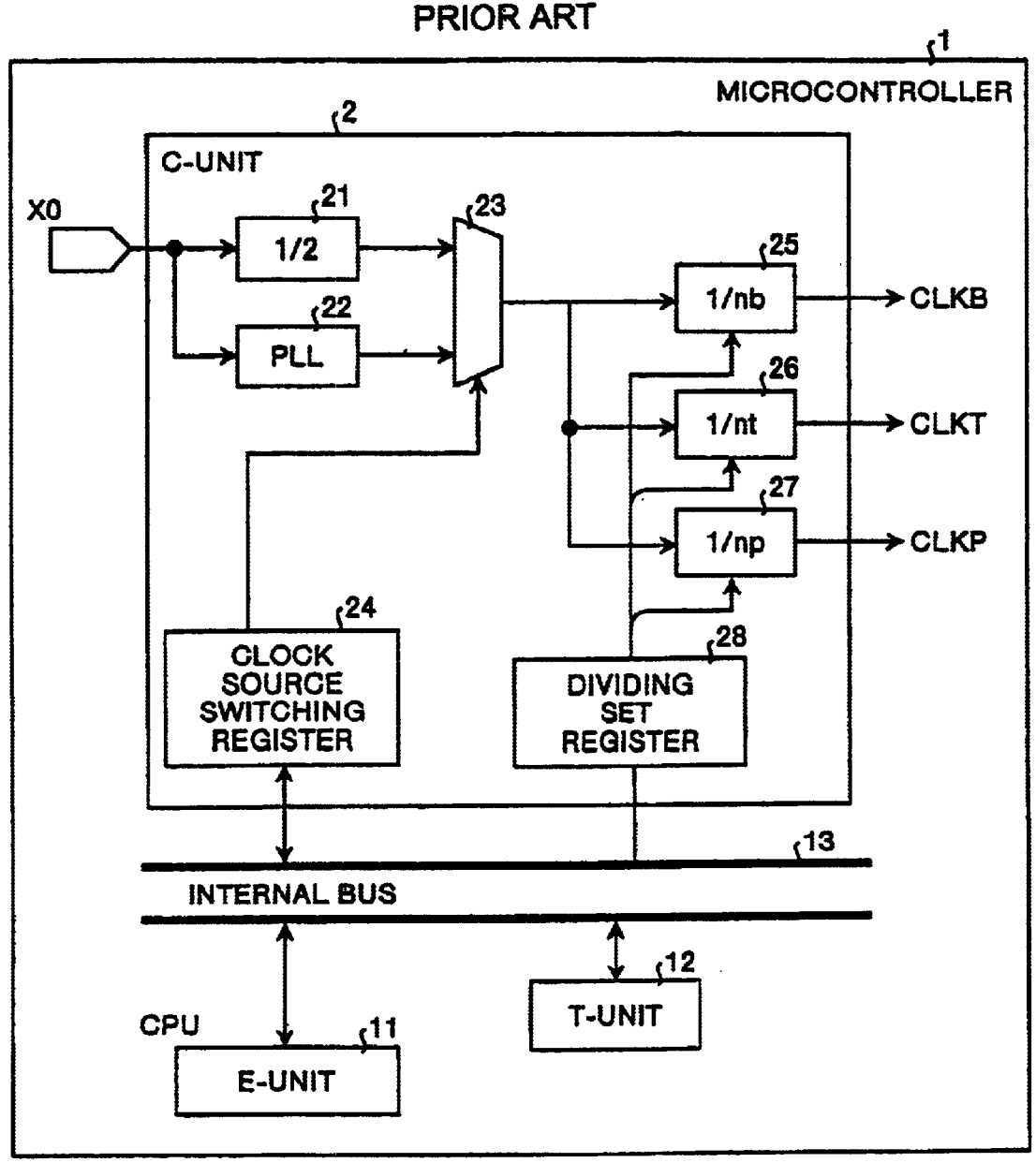
FIG. 1 is a block diagram showing a main section of a microcontroller into which a conventional clock control circuit is mounted.
Figure 2:
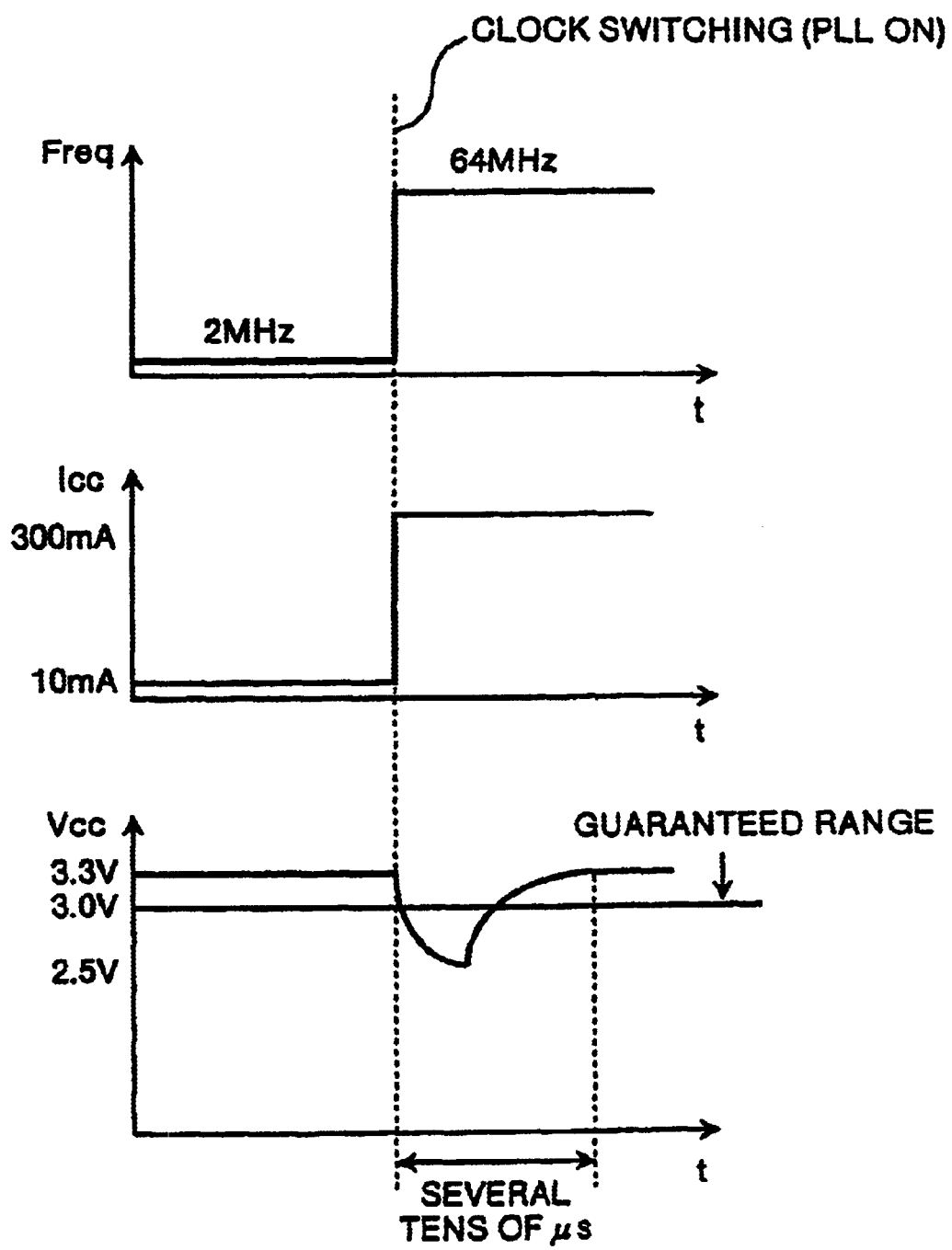
FIG. 2 is a waveform chart schematically showing changes in an electric current and a voltage at the time of clock transition by means of the conventional clock control circuit shown in FIG. 1.
Figure 3:
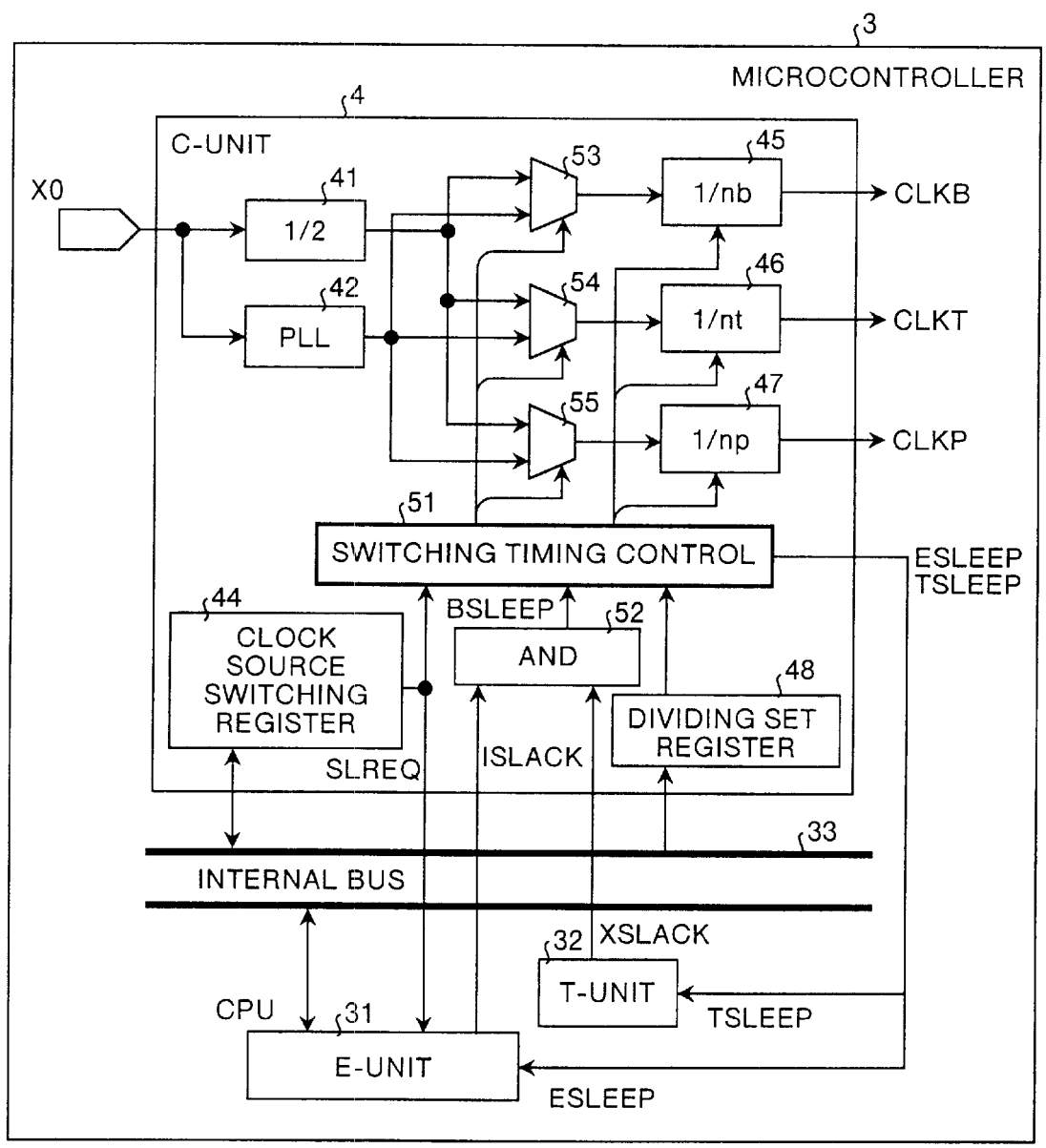
FIG. 3 is a block diagram showing a main section of a microcontroller into which a clock control circuit of the present invention is mounted.

Embodiments of the present invention will be explained with reference to the accompanying diagrams. FIG. 3 is a block diagram showing a main section of a microcontroller into which a clock control circuit of the present invention is mounted. This microcontroller 3 is constituted so that a C-unit 4 for controlling switching of a clock, an E-unit 31 to be a CPU core, and a T-unit 32 for controlling an external bus interface are connected to an internal bus 33. The C-unit 4, the E-unit 31, and the T-unit 32 are the other device(s) in the claims.

The C-unit 4 has a bisecting divider (½) 41 for bisecting an external oscillation input (X0), for example, a PLL 42 for multiplying the external oscillation input (X0), and three selectors 53, 54 and 55 for selecting any one of output clocks of the bisecting divider 41 and the PLL 42. The selectors 53, 54 and 55 select a clock according to stored values of a clock source switching register 44. The bisecting divider 41 and the PLL 42 have a function as low speed clock supply unit which supplies a low speed clock and a function as high speed clock supply unit which supplies a high speed clock respectively. The selectors 53, 54 and 55 have a function as selection unit which selects any one of the low speed clock and the high speed clock. The clock source switching register 44 has a function as control unit which controls selection of output clocks of the selectors 53, 54 and 55.

In addition, the C-unit 4 has a CLKB-use nb divider (1/nb) 45 for dividing the output clocks of the selectors 53, 54 and 55 and outputting clock CLKB for the CPU core, a CLKT-use nt divider (1/nt) 46 for outputting clock CLKt for the external bus interface, and a CLKP-use np divider (1/np) 47 for outputting clock CLKP for a peripheral circuit as dividing unit. Dividing ratios of the CLKB-use nb divider (1/nb) 45, the CLKT-use nt divider (1/nt) 46 and the CLKP-use np divider (1/np) 47 are set according to stored values of a dividing set register 48 as dividing ratio set unit.

When the clock source switching register 44 is requested to switch a clock (register write), it outputs a sleep request signal SLREQ to the E-unit 31, and requests the E-unit 31 to stop an operation of CPU. When the the CPU is in a state that its operation can be stopped, the E-unit 31 outputs a sleep acknowledge signal ISLACK to the C-unit 4. Moreover, when the T-unit 32 is not being operated, it outputs a sleep acknowledge signal XSLACK which represents transition to a sleep state to the C-unit 4. The C-unit 4 has an AND circuit 52 for taking AND logic of the two acknowledge signals ISLACK and XSLACK and outputting a sleep permission signal BSLEEP.

In addition, the C-unit 4 has a switching timing control circuit 51 for controlling switching timing of the clock for the selectors 53, 54 and 55. This switching timing control circuit 51 controls timing of the transition from the normal sate to the sleep state and timing of the transition from the sleep state to the normal state for a unit whose clock is switched into a higher speed clock than a current clock such as the E-unit 31 or the T-unit 32. Therefore, the switching timing control circuit 51 has a function as sleep control unit.

When the switching timing control circuit 51 receives the sleep permission signal BSLEEP, it generates a clock source switching signal and sleep signals ESLEEP and TSLEEP. The clock source switching signal is generated based on a stored value of the clock source switching register 44 so as to be supplied to the selectors 53, 54 and 55. The sleep signal represented by ESLEEP is supplied to the E-unit 31. The sleep signal represented by TSLEEP is supplied to the T-unit 32. The switching timing control circuit 51 can control connection between output timing of the clock source switching signal and output timing of the sleep signals ESLEEP and TSLEEP.

After reset of the microcontroller 3 having the above structure is released, the microcontroller 3 operates with bisection of the external oscillation input (X0) by means of the bisecting divider 41. During the period of the operation with bisection, various initializing operations are performed. After a multiplying rate of the PLL 42 is set and oscillation of the PLL 42 is stabilized, a dividing ratio is set in the dividing set register 48 so that an objective frequency is obtained. Thereafter, in order to switch a supply clock to the internal circuit from the bisection of the external oscillation input (X0) into the PLL clock, "1" is written into the clock source switching register 44 so that the PLL 42 is enabled.

Simultaneously with or before or after this, a clock of a clock switching candidate unit is stopped by the switching timing control circuit 51 so that the unit is allowed to go into the sleep state and the dissipation power is suppressed. Thereafter, a wake-up interrupt factor is generated by a timer or the like, and after actual operation stabilization waiting time has passed, the sleep request is canceled by the wake-up interrupt fact so that the clock switching candidate unit is permitted of the clock operation.

Figure 4:
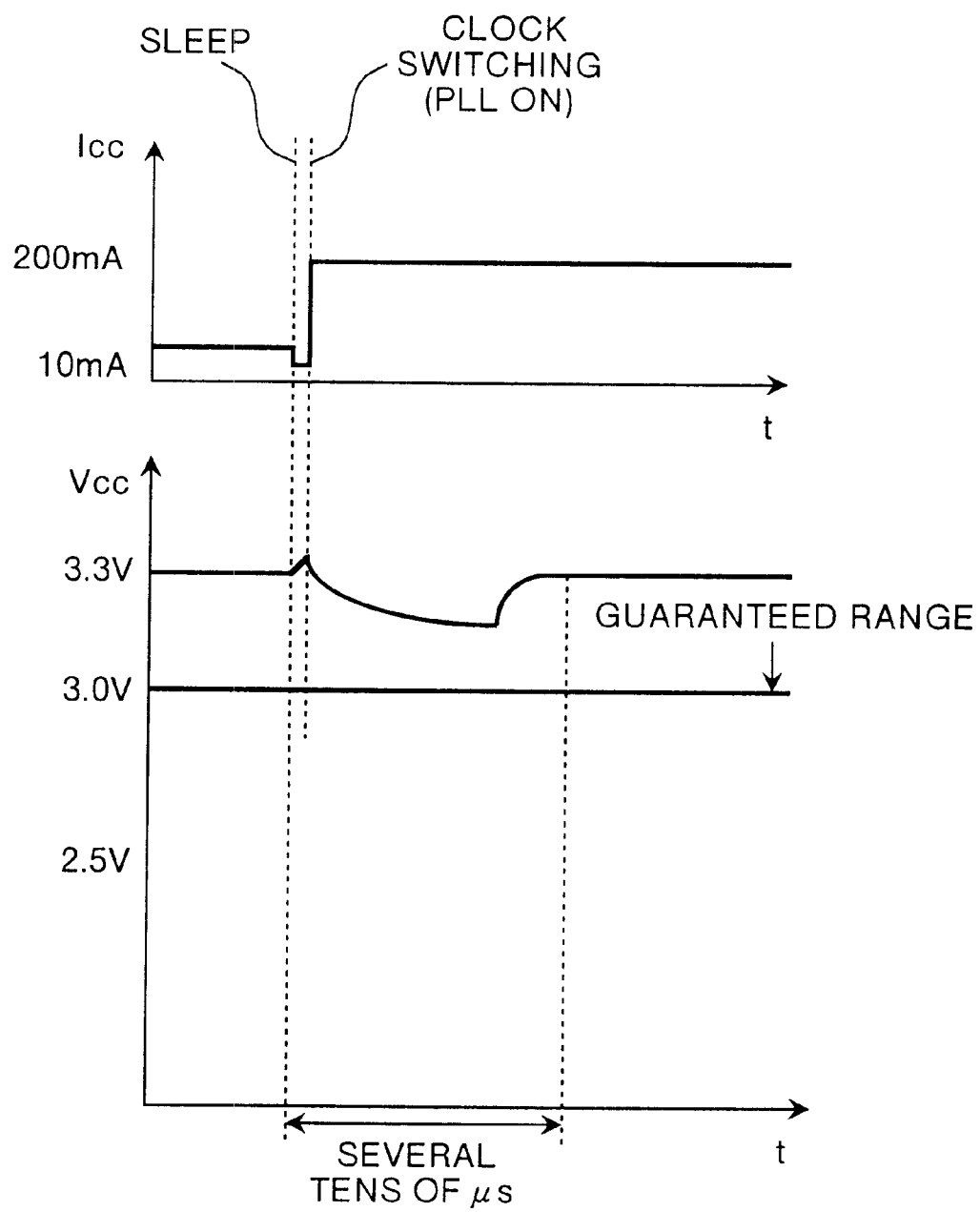
FIG. 4 is a waveform chart schematically showing changes in an electric current and a voltage at the time of clock transition in the case where a clock is switched after the clock control circuit shown in FIG. 3 is brought into a sleep state.

Next, there will be explained below the connection between the timing of the switching of the clock source and the timing of the state transition of the clock switching candidate unit, and changes in a dissipation current Icc and an internal voltage Vcc in the connection. FIG. 4 is a waveform chart schematically showing the changes in the dissipation current Icc and the internal voltage Vcc in the case where when the clock source is switched from low speed into high speed, the clock switching candidate unit is allowed to go into the sleep state and a clock is switched and after the oscillation of the switched clock and the internal voltage are stabilized, the clock switching candidate unit is returned from the sleep state to the normal state.

Figure 5:
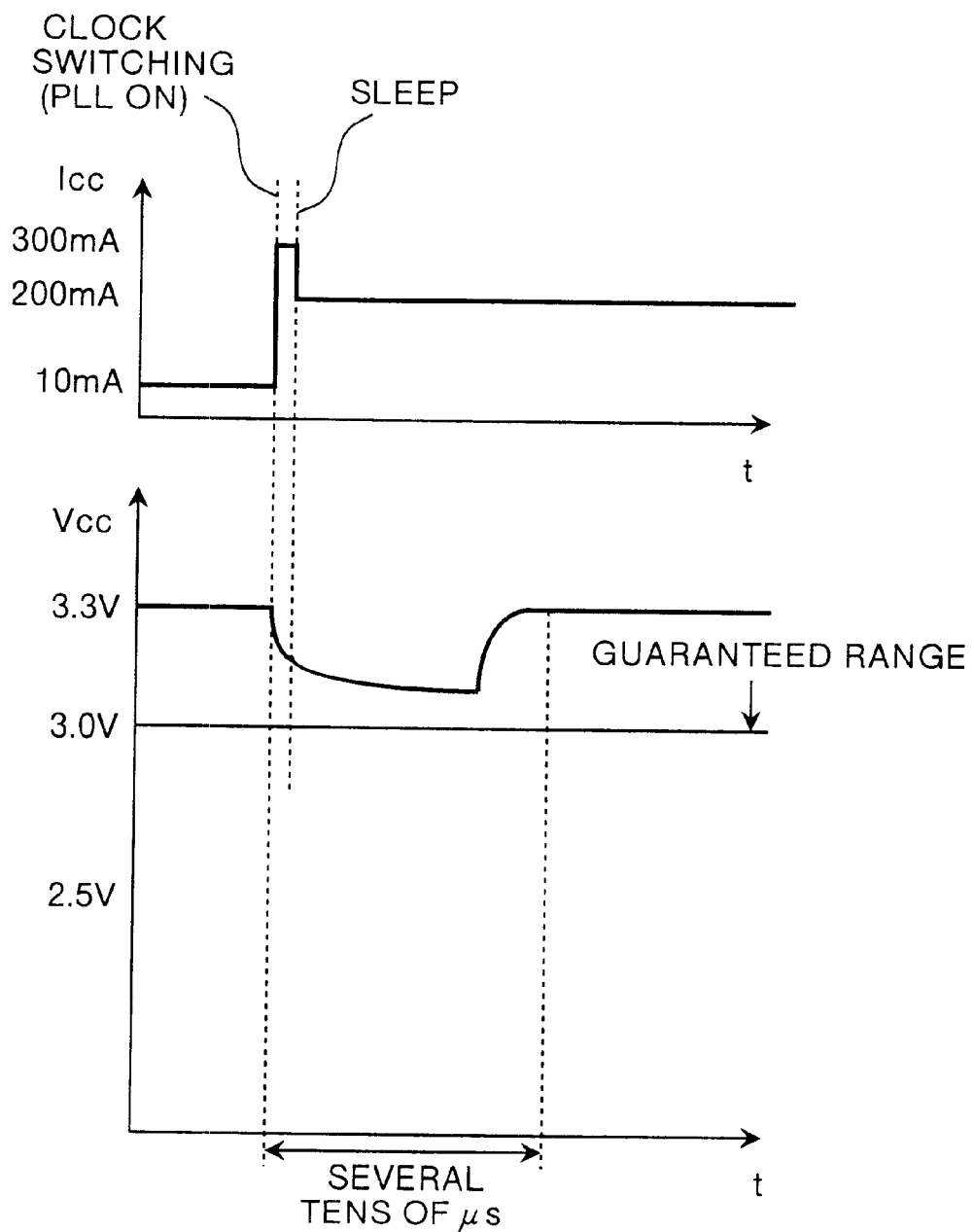
FIG. 5 is a waveform chart schematically showing changes in an electric current and a voltage at the time of clock transition in the case where the clock control circuit shown in FIG. 3 is brought into a sleep state after the clock is switched.

FIG. 5 is a waveform chart schematically showing the changes in the dissipation current Icc and the internal voltage Vcc in the case where when the clock source is switched from low speed into high speed, after a clock is switched, the clock switching candidate unit is allowed to go into the sleep state and after the oscillation of the switched clock and the internal voltage are stabilized, the clock switching candidate unit is returned from the sleep state to the normal state.

Figure 6:
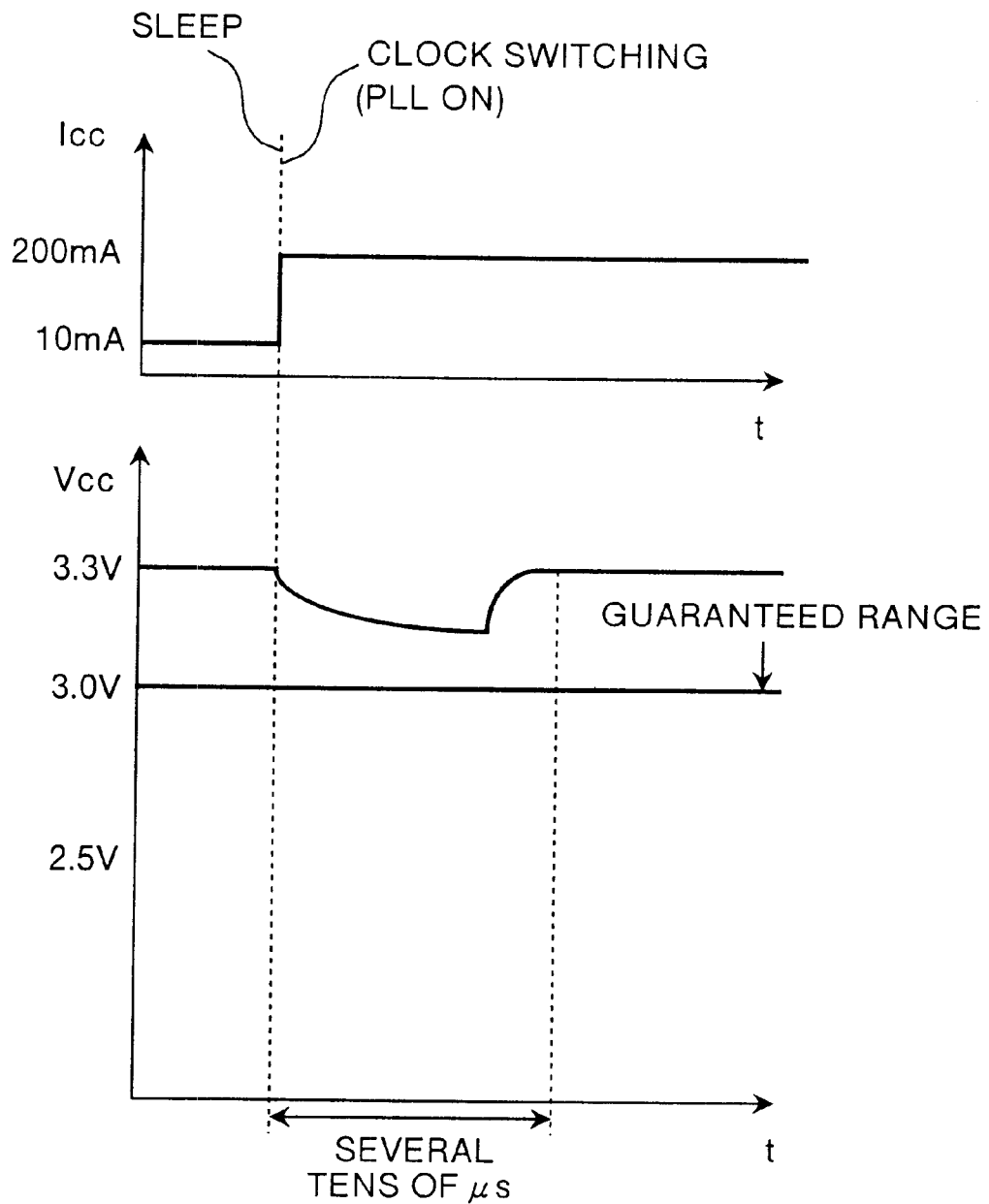
FIG. 6 is a waveform chart schematically showing changes in an electric current and a voltage at the time of clock transition in the case where the clock control circuit shown in FIG. 3 is brought into a sleep state simultaneously with the switching of the clock.

FIG. 6 is a waveform chart schematically showing the changes in the dissipation current Icc and the internal voltage Vcc in the case where when the clock source is switched from low speed into high speed, after a clock is switched and simultaneously the clock switching candidate unit is allowed to go into the sleep state and the oscillation of the switched clock and the internal voltage are stabilized, the clock switching candidate unit is returned from the sleep state to the normal state. In all the cases shown in FIGS. 4 to 6, the internal voltage Vcc is maintained higher than a guaranteed voltage until it is stabilized.

Figure 7:
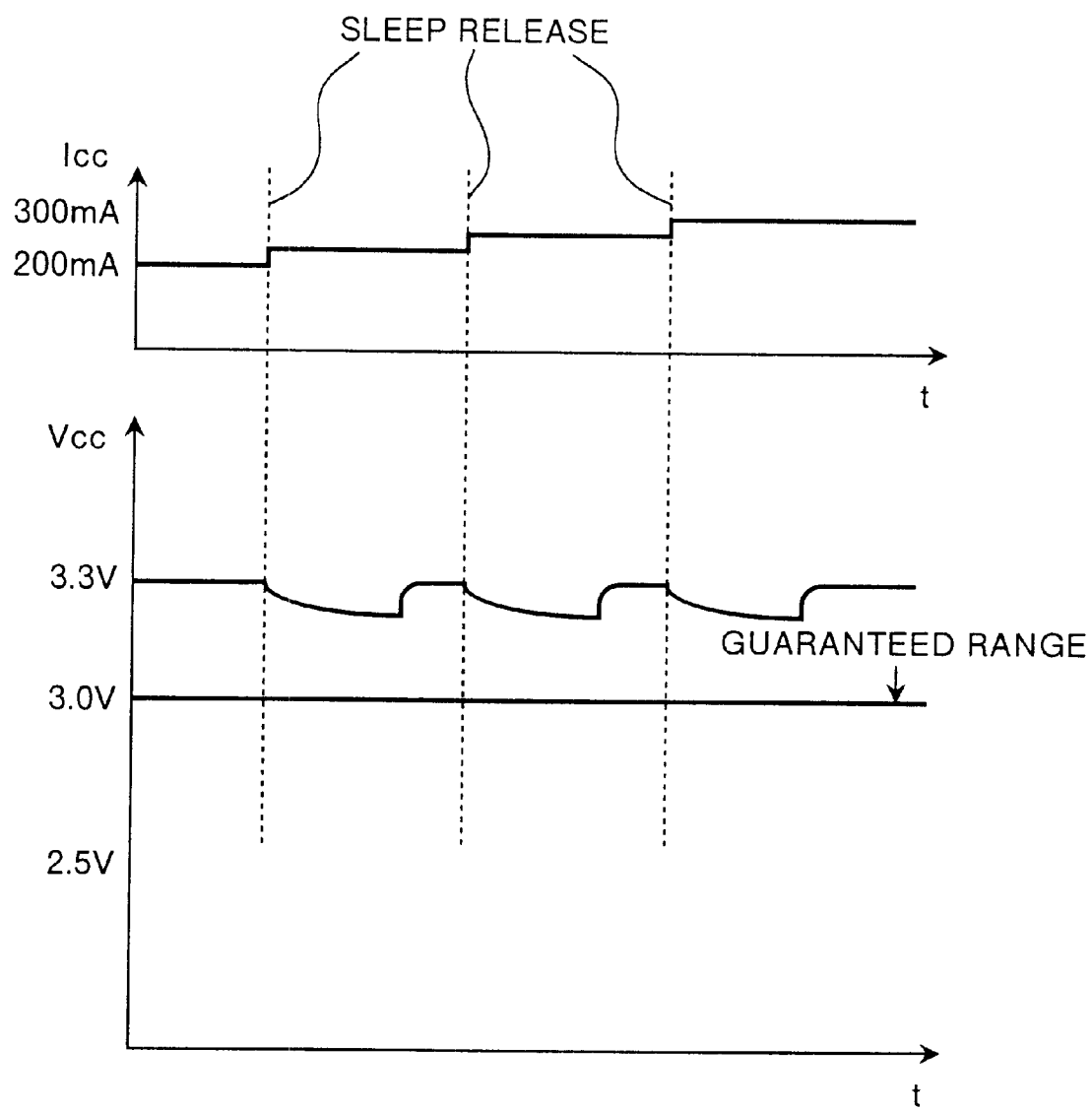
FIG. 7 is a waveform chart schematically showing changes in an electric current and a voltage in the case where the clock control circuit shown in FIG. 3 is returned from the sleep state into a normal state gradationally.

FIG. 7 is a waveform chart schematically showing the changes in the dissipation current Icc and the internal voltage Vcc in the case where a plurality of units whose clock was switched are returned from the sleep state to the normal state not at the same time but dividedly two or more times, for example three times in the diagrams. This means that, for example, the sleep signal ESLEEP supplied to the E-unit 31 and the sleep signal TSLEEP supplied to the T-unit 32 are released not at the same time but at different timings. Also in the case shown in FIG. 7, the internal voltage Vcc is maintained higher than the guaranteed voltage until it is stabilized.

Figure 8:
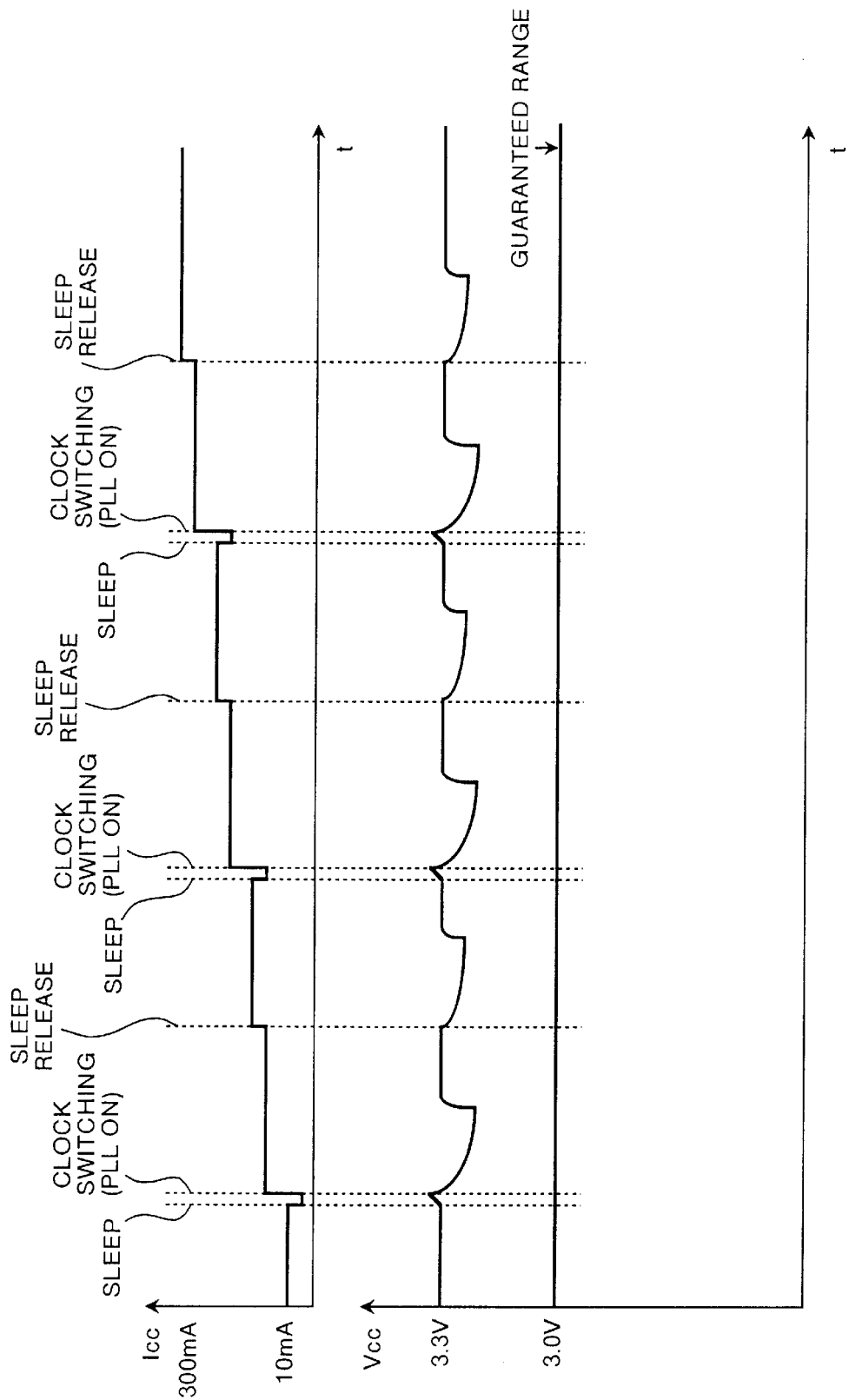
FIG. 8 is a waveform chart schematically showing changes in an electric current and a voltage at the time of clock transition in the case where the clock is switched after the clock control circuit shown in FIG. 3 is brought into a sleep state per unit.

FIG. 8 is a waveform chart schematically showing the changes in the dissipation current Icc and the internal voltage Vcc in the case where when the clock source is switched from low speed into high speed, after a certain clock switching candidate unit is allowed to go into the sleep state, a clock is switched, and after the oscillation of the switched clock and the internal voltage are stabilized, the clock switching candidate unit is returned from the sleep state to the normal state and a clock is switched similarly in another unit.

Figure 9:
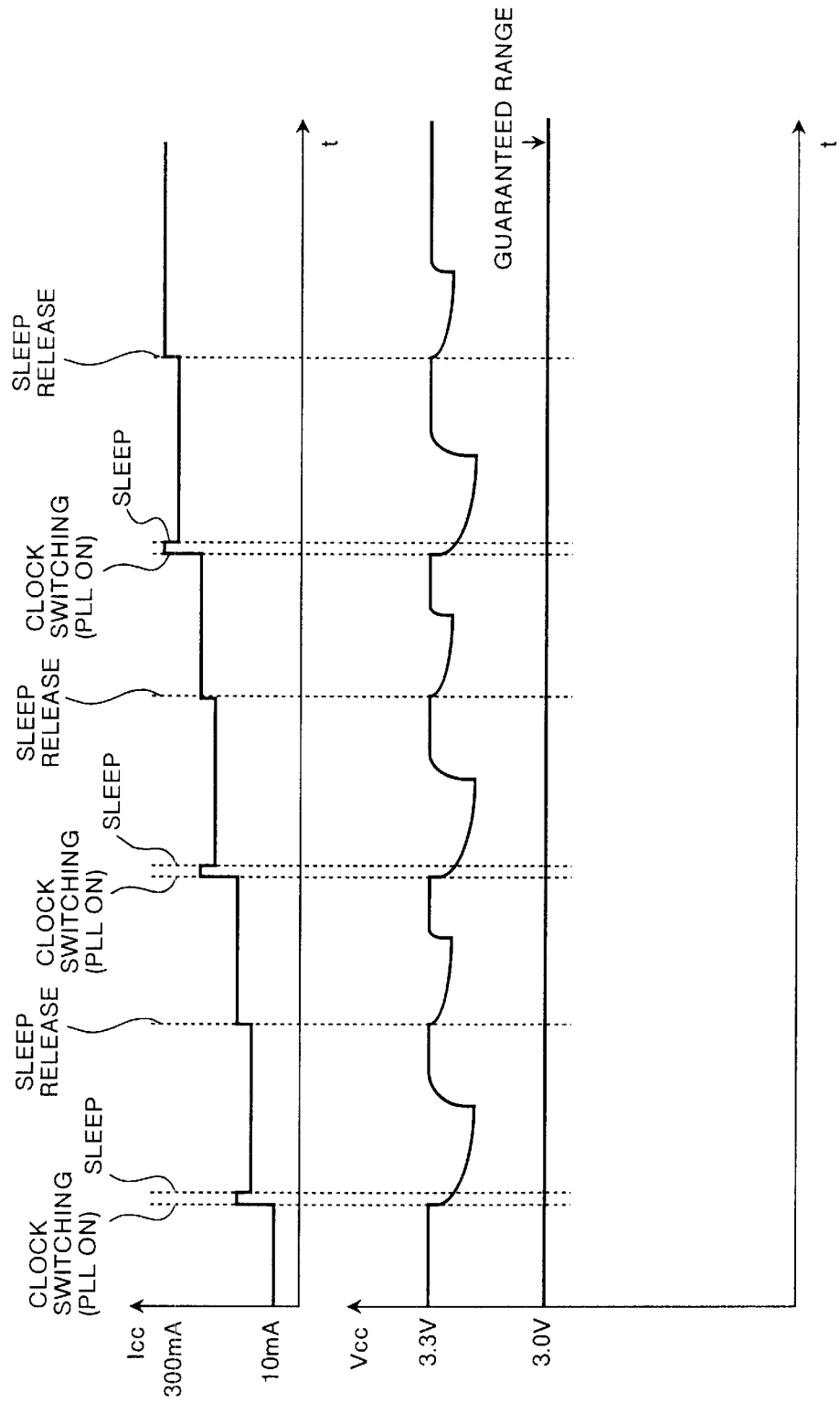
FIG. 9 is a waveform chart schematically showing changes in an electric current and a voltage at the time of clock transition in the case where the clock control circuit shown in FIG. 3 is brought into a sleep state after the clock is switched per unit.

FIG. 9 is a waveform chart schematically showing the changes in the dissipation current Icc and the internal voltage Vcc in the case where when the clock source is switched from low speed into high speed, after a clock is switched in a certain clock switching candidate unit, the unit is allowed to go into the sleep state, and after the oscillation of the switched clock and the internal voltage are stabilized, the clock switching candidate unit is returned from the sleep state to the normal state and a clock is switched similarly in another unit.

Figure 10:
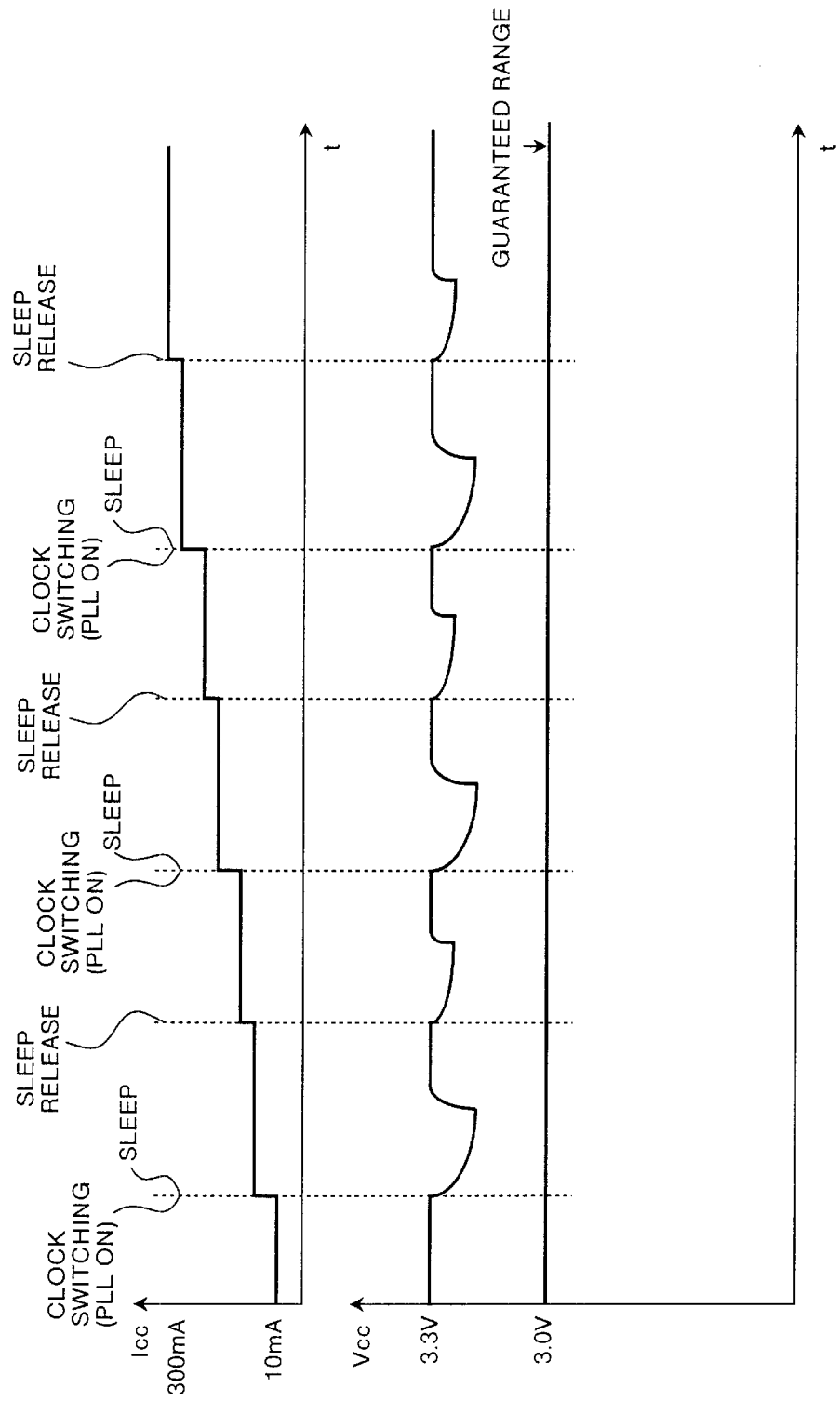
FIG. 10 is a waveform chart schematically showing changes in an electric current and a voltage at the time of clock transition in the case where the clock control circuit shown in FIG. 3 is brought into a sleep state simultaneously with the switching of the clock per unit.

FIG. 10 is a waveform chart schematically showing the changes in the dissipation current Icc and the internal voltage Vcc in the case where when the clock source is switched from low speed into high speed, a clock is switched in a certain clock switching candidate unit and simultaneously the unit is allowed to go into the sleep state, and after the oscillation of the switched clock and the internal voltage are stabilized, the clock switching candidate unit is returned from the sleep state to the normal state and a clock is switched similarly in another unit. In all the cases shown in FIGS. 8 to 10, when the clock is switched in each unit, the internal voltage Vcc is maintained higher than the guaranteed voltage until it is stabilized.

Figure 11:
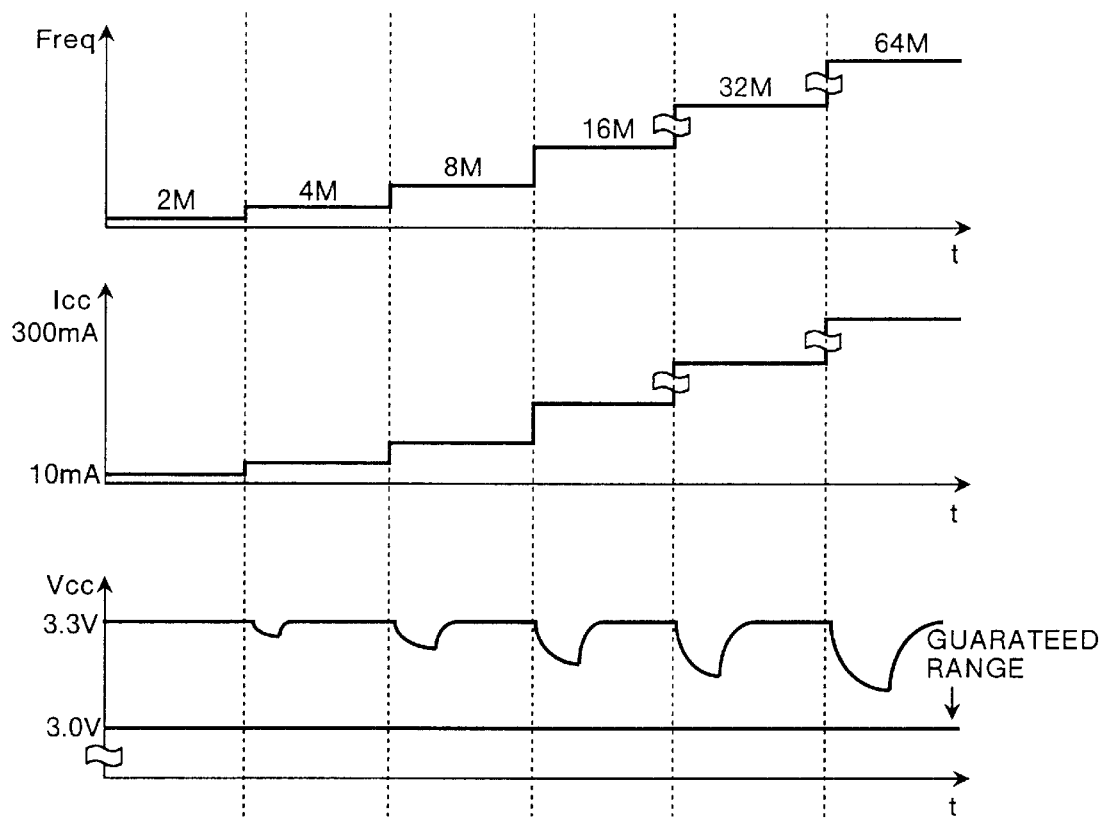
FIG. 11 is a waveform chart schematically showing changes in an electric current and a voltage in the case where a clock speed is switched so as to becomes high gradationally in the clock control circuit shown in FIG. 3.

FIG. 11 is a waveform chart schematically showing the changes in the dissipation current Icc and the internal voltage vcc in the case where when the clock source is switched from low speed into high speed, the clock speed is switched so as to be faster gradationally. In this case, after the clock speed is switched, the internal voltage Vcc is stabilized, and the clock speed is made to be faster at one stage.

Figure 12:
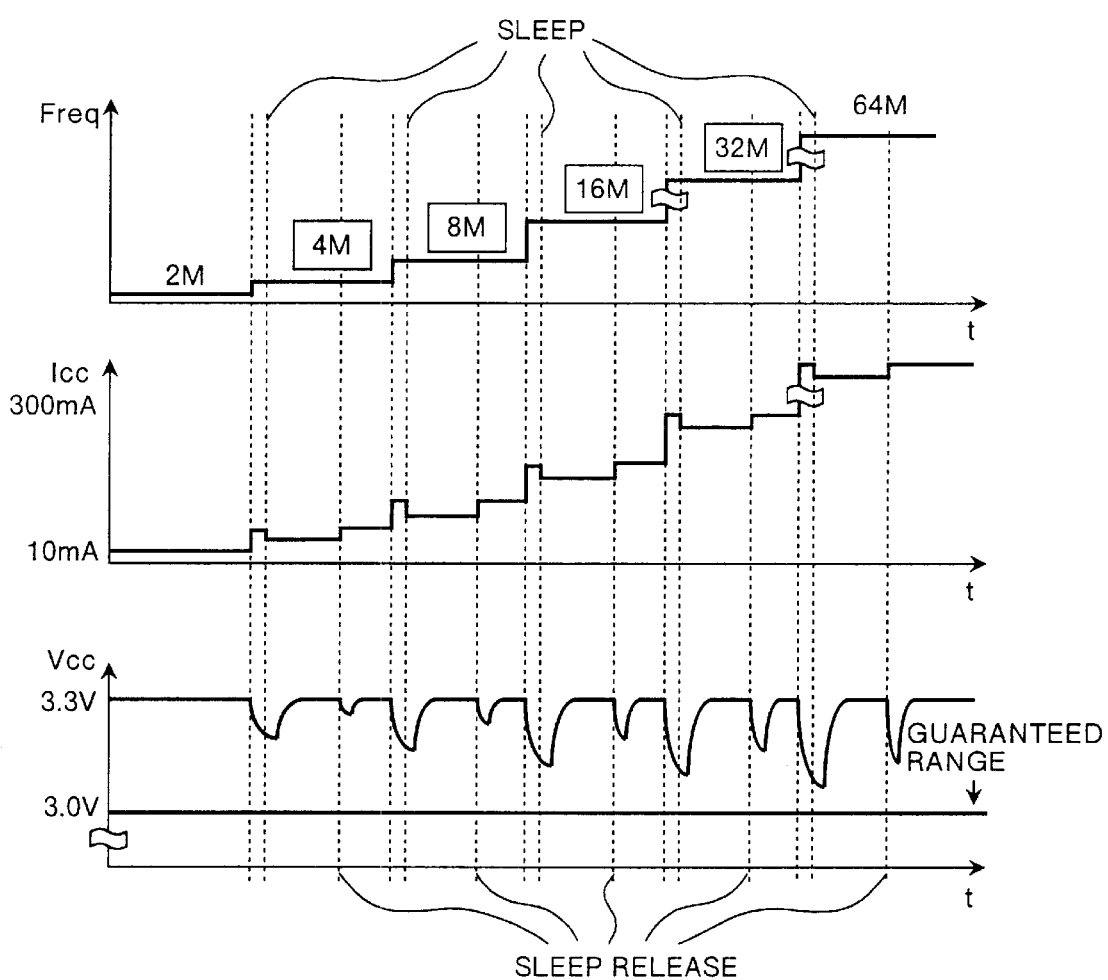
FIG. 12 is a waveform chart schematically showing changes in an electric current and a voltage in the case where the clock speed is switched so as to become high gradationally while the clock control circuit shown in FIG. 3 is brought into the sleep state.

FIG. 12 is a waveform chart schematically showing the changes in the dissipation current Icc and the internal voltage Vcc in the case where when the clock source is switched from low speed into high speed, the clock speed is made to be faster gradationally and simultaneously each time when the clock speed is made to be fast at one stage, immediately a unit is allowed to go into the sleep state, and after the oscillation of the faster clock and the internal voltage are stabilized, the unit is returned from the sleep state to the normal state. In the cases shown in FIGS. 11 and 12, each time when the clock is made to be faster gradationally, the internal voltage Vcc is maintained higher than the guaranteed voltage until it is stabilized.

There will be explained below the processing procedure in the case where the timing of switching of the clock source and the timing of the state transition of a clock switching candidate unit are controlled by a software. In the case where this timing is controlled by a software, the CPU reads a program from a ROM or the like where the program of this software is stored and executes it. At this time, the CPU utilizes RAM or the like as a work area.

Figure 13:
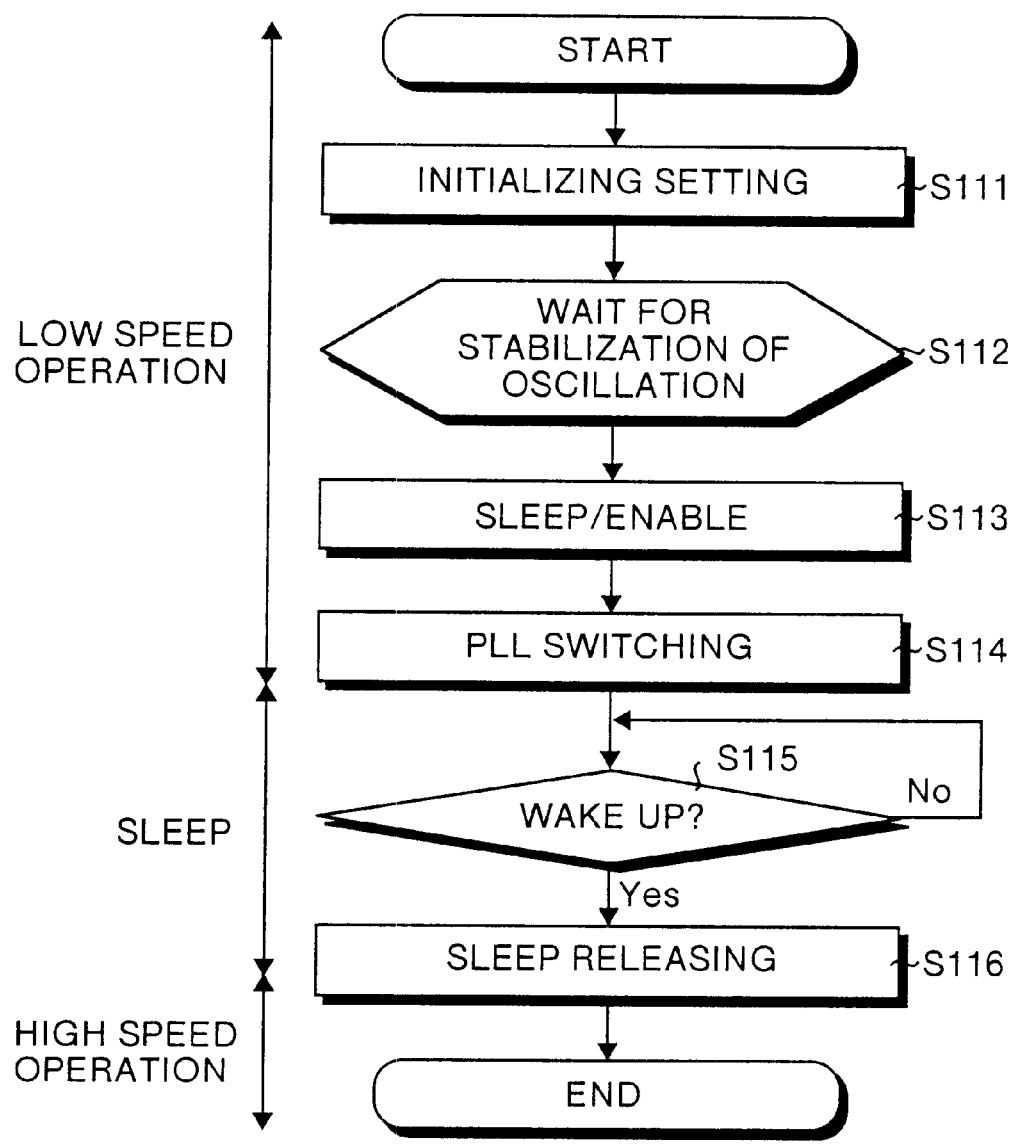
FIG. 13 is a flowchart showing a processing procedure in the case where a clock source shown in FIG. 4 is switched and timing of state transition of a clock switching candidate unit is controlled by a software.

FIG. 13 is a flowchart showing the processing procedure in the case where the timing of the switching of the clock source shown in FIG. 4 and the transition state of a clock switching candidate unit is controlled by a software. As shown in FIG. 13, firstly after the reset is released, the microcontroller is operated with bisection of the external oscillation input (X0) by bisecting divider 41, and during this period various initializing settings such as setting of the multiplying rate of the PLL 42 are carried out (step S111). Thereafter, after the oscillation of the PLL 42 is stabilized (step S112), a clock switching candidate unit is allowed to go into the sleep state (step S113).

Thereafter, the PLL 42 is enabled, and the supply clock to the internal circuit is switched from the bisection of the external oscillation input (X0) into a PLL clock (step S114). Moreover, dividing ratios of n dividers 45, 46 and 47 are set. The processing procedure waits until the wake-up interrupt factor is generated (step S115). After the actual operation stabilization waiting time has passed, the sleep state is released by the wake-up interrupt factor, and a permitting operation of the clock switching candidate unit is performed (step S116). As a result, the high speed operation is enabled. The process is ended.

When the timing of the switching of the clock source and the state transition of a clock switching candidate unit shown in FIG. 5 is controlled by a software, in the flowchart shown in FIG. 13 the step of allowing the unit to go into the sleep state (step S113) and the step of enabling the PLL 42 (step S114) may be interchanged. Moreover, in the case where the timing of the switching of the clock source and the state transition of a clock switching candidate unit is controlled by a software, in the flowchart shown in FIG. 13 the step of allowing the unit to go into the sleep state (step S113) and the step of enabling the PLL 42 (step S114) may be executed simultaneously.

Figure 14:
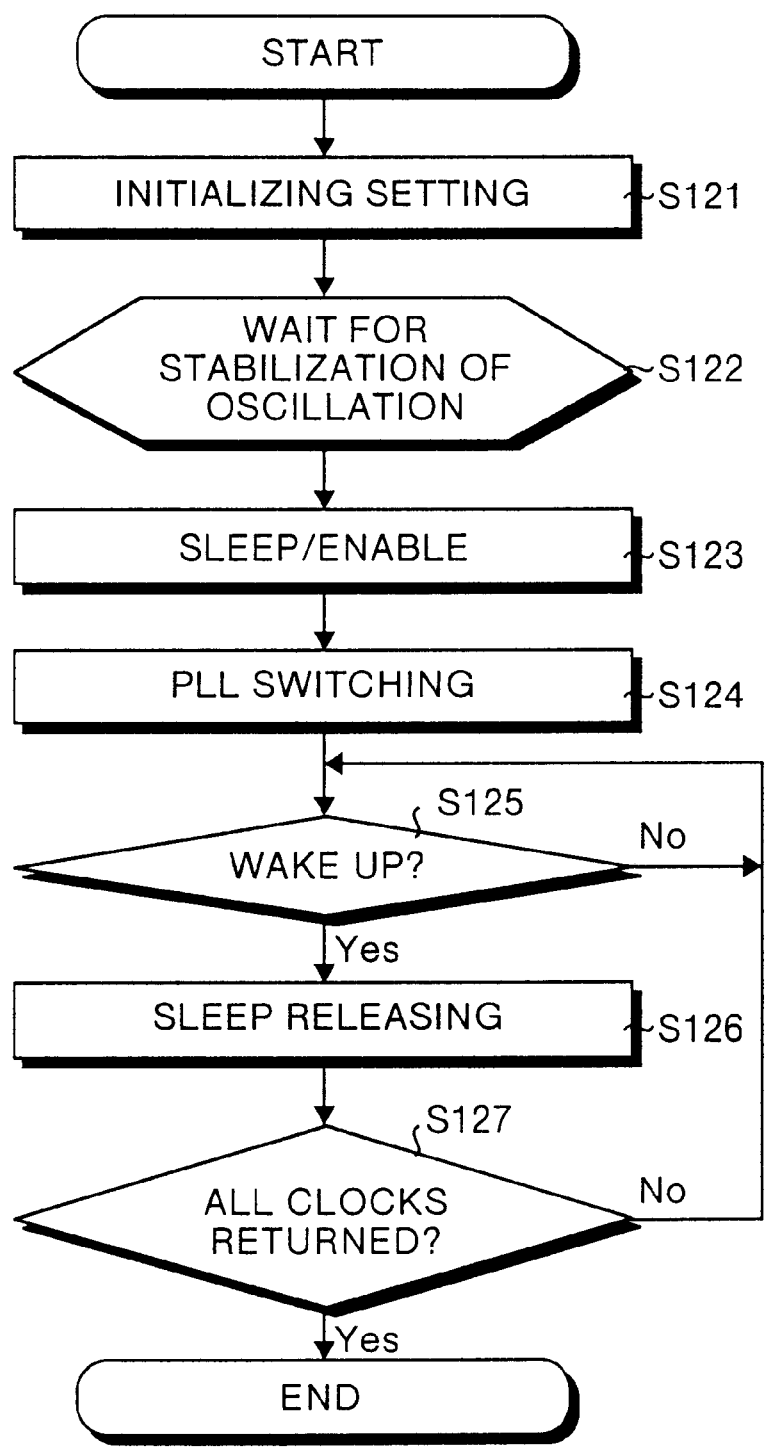
FIG. 14 is a flowchart showing a processing procedure in the case where control that the unit is returned from the sleep state gradationally shown in FIG. 7 is made by a software.

FIG. 14 is a flowchart showing the processing procedure of the control for returning a unit from the sleep state gradationally shown in FIG. 7. As shown in FIG. 14, firstly after the reset is released, the microcontroller is operated with bisection of the external oscillation input (X0) by the bisecting divider 41, and during this period various initializing settings such as setting of a multiplying rate of the PLL 42 are carried out (step S121). After the oscillation of the PLL 42 is stabilized (step S122), all the clock switching candidate units are allowed to go into the sleep state (step S123).

Thereafter, the PLL 42 is enabled, and the supply clock to the internal circuit is switched from the bisection of the external oscillation input (X0) into the pLL clock (step S124). Moreover, the dividing ratios of the n dividers 45, 46 and 47 are set. The processing procedure waits until the wake-up interrupt factor is generated (step S125). After the actual operation stabilization waiting time has passed, the sleep state is released in some clock switching candidate units by the wake-up interrupt factor, and the some clock switching candidate units are permitted of the clock operation (step S126).

The sleep state is released successively in the clock switching candidate units in the sleep state by the wake-up interrupt factor until release of the sleep state is finished in all the clock switching candidate units. After release of the sleep state of all the clock switching candidate units is finished and all the clocks are returned (step S127), the process is ended. The executing order of the step of allowing a unit to go into the sleep state (step S123) and the step of enabling the PLL 42 (step S124) can be reversed or these steps can be executed simultaneously.

Figure 15:
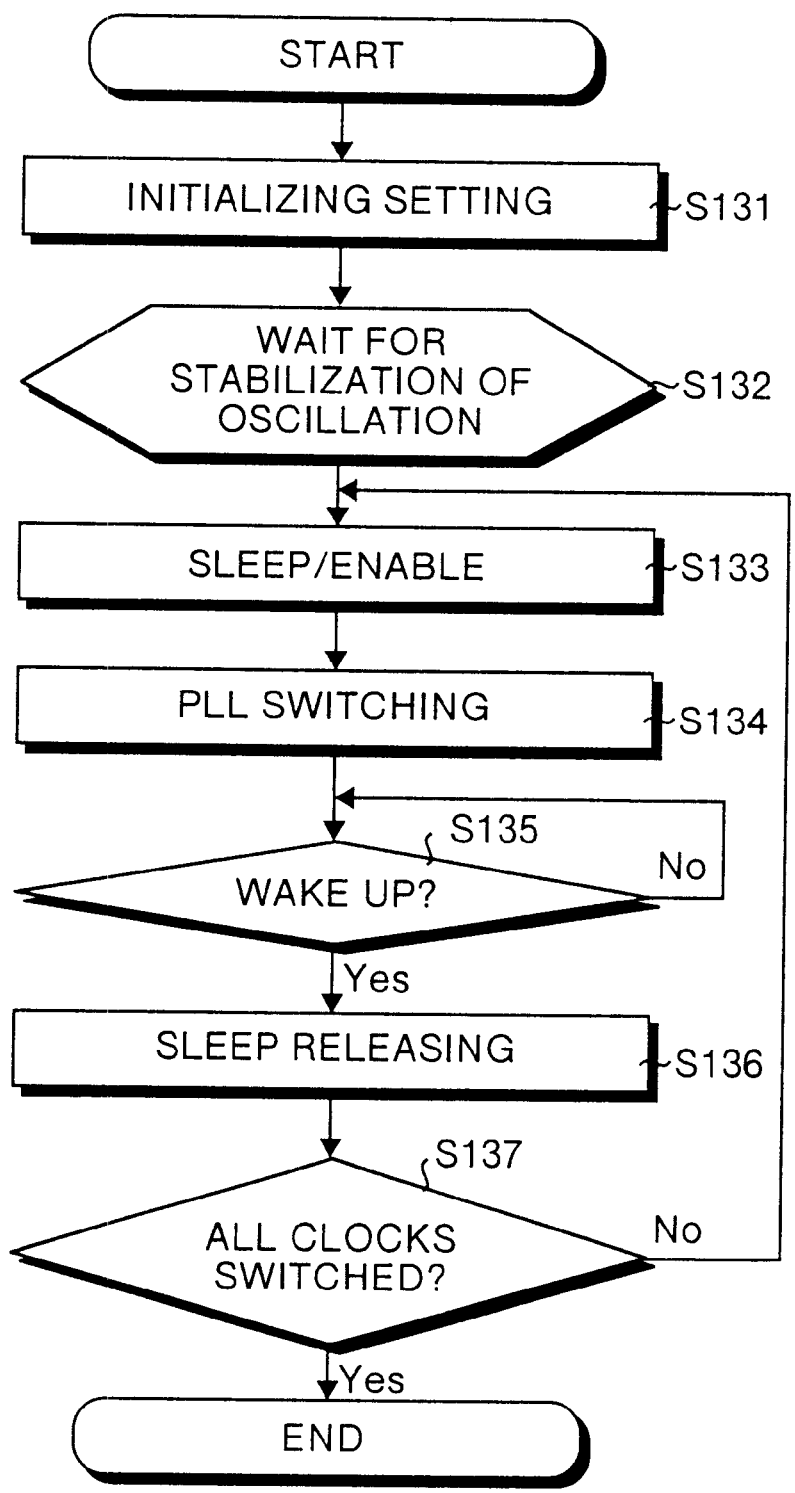
FIG. 15 is a flowchart showing a processing procedure in the case where a clock source shown in FIG. 8 is switched and timing of state transition of a clock switching candidate unit is controlled by a software.

FIG. 15 is a flowchart showing the processing procedure in the case where the timing of the switching of the clock source and the state transition of the clock switching candidate units is controlled by a software. As shown in FIG. 15, firstly after reset is released, the microcontroller is operated with the bisection of the external oscillation input (X0) by the bisecting divider 41, and during this period various initial settings such as setting of a multiplying rate of the PLL 42 are carried out (step S131). After the oscillation of the PLL 42 is stabilized (step S132), some clock switching candidate units are allowed to go into the sleep state (step S133).

Thereafter, the PLL 42 is enabled, and the supply clocks to the clock switching candidate units in the sleep state are switched from the bisection of the external oscillation input (X0) into the PLL clock (step S134) Moreover, the dividing ratios of the n dividers 45, 46 and 47 are set. The processing procedure waits until the wake-up interrupt factor is generated (step S135). After the actual operation stabilization waiting time has passed, the sleep state of the clock switching candidate units in the sleep state is released by the wake-up interrupt factor, and the clock switching candidate units are permitted of the clock operation (step S136).

In some or all remaining clock switching candidate units, the units are allowed to go into the sleep state (step S133) and are switched into the PLL clock (step S134) and the procedure waits for the generation of the wake-up interrupt factor (step S135) and the sleep state is released (step S136) until switching of the clocks of all the clock switching candidate units is completed. When the switching of the clocks in all the clock switching candidate units is completed (step S137), the process is ended. The executing order of the step of allowing a unit to go into the sleep state (step S133) and the step of enabling the PLL 42 (step S134) can be reversed or these steps can be executed simultaneously.

Figure 16:
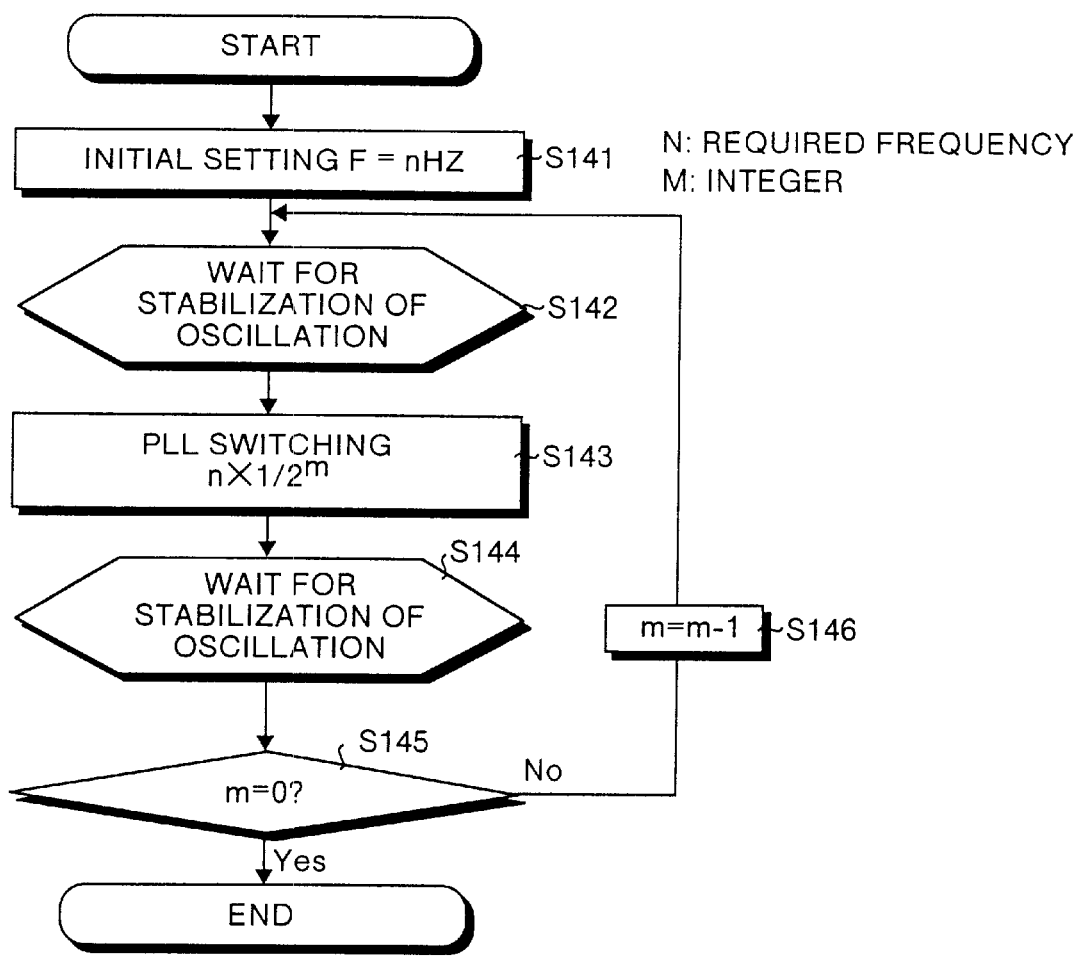
FIG. 16 is a flowchart showing a processing procedure in the case where control that the clock speed is heightened gradationally shown in FIG. 11 is made by a software.

FIG. 16 is a flowchart showing the processing procedure in the case where the clock speed shown in FIG. 11 is controlled to be faster gradationally by a software. As shown in FIG. 16, firstly after reset is released, the microcontroller is operated with the bisection of the external oscillation input (X0) by the bisecting divider 41, and during this period various initial settings are executed. At the initial settings, a required frequency n is set, and the multiplying rate of the PLL 42 is set (step S141). The process waits until the oscillation of the PLL 42 is stabilized (step S142), and the PLL 42 is enabled, and the supply clock to the internal circuit is switched from the bisection of the external oscillation input (X0) into the PLL clock.

In addition, the dividing ratios of the n dividers 45, 46 and 47 are set, and an output frequency is set to $n \times \frac{1}{2}^m$ (step S143). After the actual operation stabilization time has passed (step S144), a value of m is decreased one by one until the value becomes zero (step S146) and the clock speed is heightened gradationally. Here, a number of the decrease is not limited to one, and it may not a constant value. When the value of m becomes zero (step S145), the process is ended.

Figure 17:
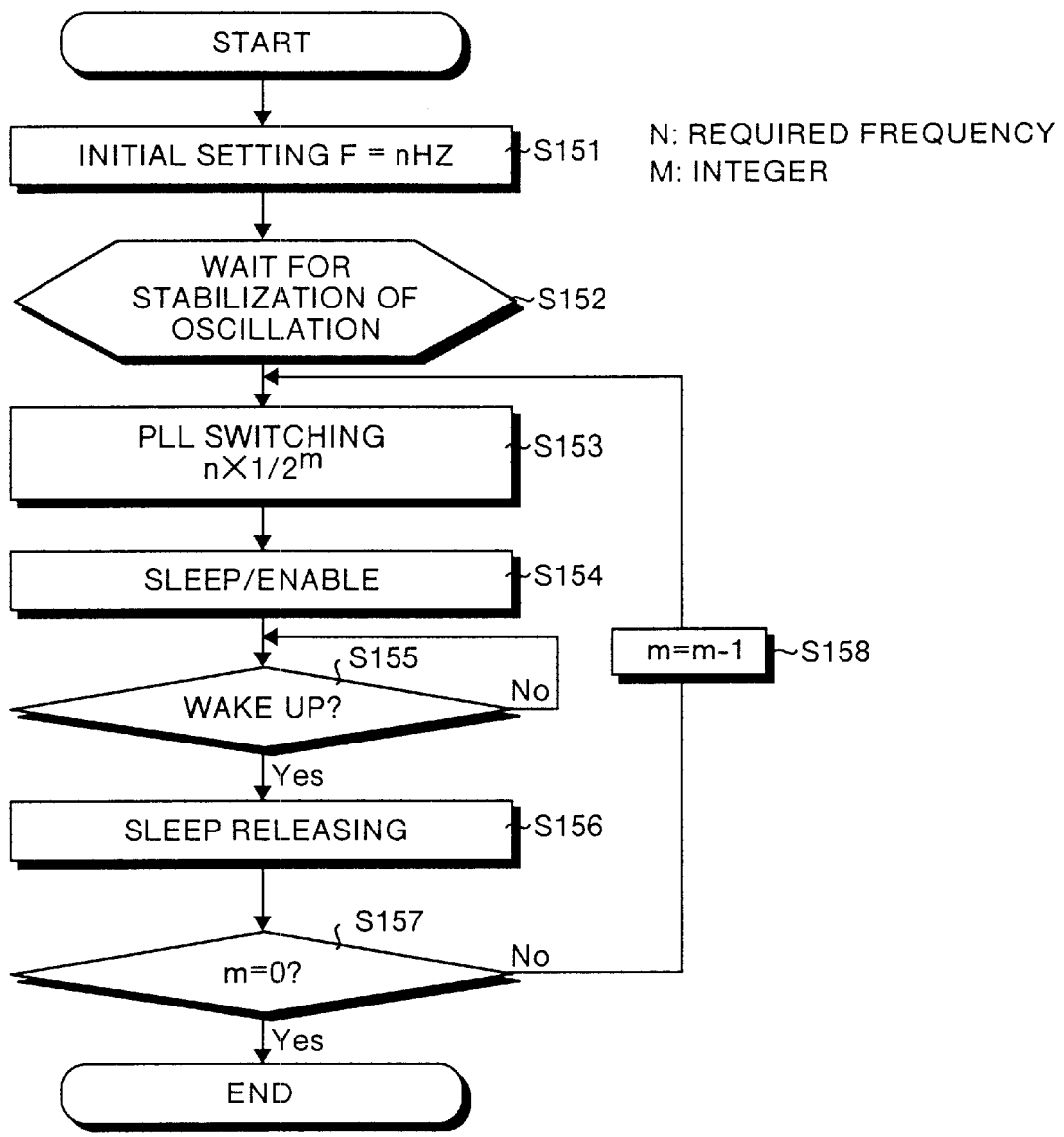
FIG. 17 is a flowchart showing a processing procedure in the case where control that the clock speed is heightened gradationally while the unit is in the sleep state shown in FIG. 12 is made by a software.

FIG. 17 is a flowchart showing the processing procedure in the case where the clock speed is heightened gradationally by a software while in the sleep state shown in FIG. 12. As shown in FIG. 17, firstly after reset is released, the microcontroller is operated with the bisection of the external oscillation input (X0) by the bisecting divider 41, and during this period various initial settings are executed. At the initial settings, a required frequency n is set, and the multiplying rate of the PLL 42 is set (step S151).

The process waits until the oscillation of the PLL 42 is stabilized (step S152), and the PLL 42 is enabled, and the supply clock to the internal circuit is switched from the bisection of the external oscillation input (X0) into the PLL clock. Moreover, the dividing ratios of the n dividers 45, 46 and 47 are set, and the output frequency is set to n×½$^m$ (step S153). Further, a clock switching candidate unit is allowed to go into the sleep state (step S154). The process waits until the wake-up interrupt factor is generated (step S155), and after the actual operation waiting time has passed, the sleep state is released by the wake-up interrupt factor, and the clock switching candidate unit is permitted of the clock operation (step S156).

The value of m is decreased one by one until the value becomes zero (step S158) so that the clock speed is heightened at each stage. The number of the decrease is not limited to 1, and it may not a constant number. Every time when the clock speed is heightened, the transition to the sleep state and the release of the sleep state are executed. In such a manner, the clock speed is heightened gradationally. When the value of m becomes zero (step S157), the process is ended. The executing order of the step of enabling the PLL 42 (step S153) and the step of allowing a unit to go into the sleep state (step S154) can be reversed, or the steps can be executed simultaneously.

According to the above-mentioned embodiment, when the clock source is switched from low speed clock into high speed clock, a clock switching candidate unit is once allowed to go into the sleep mode simultaneously with or before or after the switching of the clock source so that internal resistance becomes great and the dissipation power is reduced. For this reason, a voltage drop becomes slow, and the guaranteed voltage can be maintained until the internal voltage is returned. Moreover, in the clock switching candidate unit, the state of transition to the sleep mode is maintained. Therefore, when the clock source is switched, occurrence of a malfunction can be avoided.

In addition, according to the above embodiment, when the clock source is switched from low speed clock into high speed clock, the clock speed is heightened gradationally so that a change width of a dissipation current is small and a drop of the internal voltage can be slackened. For this reason, the guaranteed voltage can be maintained until the internal voltage is returned. Therefore, also in this case, when the clock source is switched, occurrence of a malfunction can be avoided.

The present invention is not limited to the above-mentioned embodiment and can be changed variously. For example, the sleep state may be released simultaneously in all the clock switching candidate units, or the sleep state maybe released in some of the clock switching candidate units. Moreover, the clocks maybe switched simultaneously in all the clock switching candidate units, or the clocks may be switched in some of the clock switching candidate units. Further, a number of the clocks that the frequencies are to be switched is not limited to three: CLKB, CLKT and CLKP, and it may be 1, 2 or not less than 4. Moreover, a number of the external clocks (external oscillation input) may be two or more.

According to one aspect of the present invention, when a clock source is switched from a low speed clock into a high speed clock, a clock switching candidate device is once brought into a sleep mode so that an internal resistance becomes great, and a degree of a voltage drop with respect to time axis is lowered. For this reason, a guaranteed voltage can be maintained until an internal voltage is returned. Moreover, a state of transition to a sleep state is maintained. Therefore, at the time of switching the clock source, occurrence of a malfunction can be avoided.

In addition, according to another invention, when a clock source is switched from a low speed clock into a high speed clock, a clock speed is heightened gradationally so that a change width of a dissipation power is decreased, and a drop of the internal voltage can be relieved. For this reason, the guaranteed voltage can be maintained until the internal voltage is returned. Therefore, at the time of switching the clock source, occurrence of a malfunction can be avoided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A clock control circuit, comprising:
   a low speed clock supply unit which outputs a low speed clock;
   a high speed clock supply unit which outputs a high speed clock whose frequency is higher than the low speed clock;
   a selection unit which selects and outputs any one of the low speed clock output from the low speed clock supply unit and the high speed clock output from the high speed clock supply unit;
   a control unit which controls the selection of the clock by the selection unit; and
   a sleep control unit which allows at least one circuit, whose clock is to be switched-over from the low speed clock to the high speed clock, to go into a sleep state before the selection unit selects and outputs the high speed clock to the at least one circuit and allows the at least one circuit to go into a normal state after the high speed clock is selected and output from the selection unit.

2. The clock control circuit according to claim 1, wherein, when there exists a plurality of circuits whose clocks are to be switched-over, the sleep control unit allows the plurality of the other circuits, allowed to go into the sleep state at the time of switching to the high speed clock, to go into the normal state at respective, different times.

3. A clock control circuit, comprising:
   a low speed clock supply unit which outputs a low speed clock;
   a high speed clock supply unit which outputs a high speed clock whose frequency is higher than the low speed clock;
   a selection unit which selects and outputs one of the low speed clock output from the low speed clock supply unit and the high speed clock output from the high speed clock supply unit;
   a control unit which controls the selection of the clock by the selection unit; and
   a sleep control unit which allows at least one circuit, whose clock is to be switched-over from the low speed clock to the high speed clock, to go into a sleep state just after the selection unit selects and outputs the high speed clock to the at least one circuit and allows the at least one circuit to go into a normal state after the at least one circuit is set in the sleep state.

4. The clock control circuit according to claim 3, wherein, when there exists a plurality of whose clocks are to be switched over, the sleep control unit allows the plurality other circuits, allowed to go into the sleep state at the time of switching into the high speed clock, to go into the normal state at respective, different times.

5. A clock control circuit, comprising:

a low speed clock supply unit which outputs a low speed clock;

a high speed clock supply unit which outputs a high speed clock whose frequency is higher than the low speed clock;

a selection unit which selects and outputs one of the low speed clock output from the low speed clock supply unit and the high speed clock output from the high speed clock supply unit;

a control unit which controls the selection of the clock by the selection unit; and a sleep control unit which simultaneously allows at least one circuit, whose clock is to be switched-over from the low speed clock to the high speed clock, to go into a sleep state when the selection unit selects and outputs the high speed clock to the at least one circuit and thereafter allows the at least one circuit to go into a normal state.

6. The clock control circuit according to claim 5, wherein, when there exists a plurality of circuits whose clocks are to be switched over, the sleep control unit allows the plurality of circuits, allowed to go into the sleep state at the time of switching to the high speed clock, to go into the normal state at respective, different times.

7. A clock control circuit, comprising:

a low speed clock supply unit which outputs a low speed clock;

a high speed clock supply unit which outputs a high speed clock whose frequency is higher than the low speed clock;

a selection unit which selects and outputs one of the low speed clock output from the low speed clock supply unit and the high speed clock output from the high speed clock supply unit;

a control unit which controls the selection of the clock by the selection unit; and a sleep control unit which allows a plurality of circuits, whose clocks are to be switched-over from the low speed clock to the high speed clock, to go into a sleep state, one by one or in batches of two or more, before the selection unit selects and outputs the high speed clock to the circuits and allows the circuits to go into a normal state after the high speed clock is selected and output from the selection unit.

8. A clock control circuit, comprising:

a low speed clock supply unit which outputs a low speed clock;

a high speed clock supply unit which outputs a high speed clock whose frequency is higher than the low speed clock;

a selection unit which selects and outputs one of the low speed clock output from the low speed clock supply unit and the high speed clock output from the high speed clock supply unit;

a control unit which controls the selection of the clock by the selection unit; and a sleep control unit which allows a plurality of circuits, whose clocks are to be switched-over from the low speed clock to the high speed clock, to go into a sleep state, one by one or in batches of two or more, just after the selection unit selects and outputs the high speed clock to the circuits and thereafter allows the circuits to go into a normal state.

9. A clock control circuit, comprising:

a low speed clock supply unit which outputs a low speed clock;

a high speed clock supply unit which outputs a high speed clock whose frequency is higher than the low speed clock;

a selection unit which selects and outputs one of the low speed clock output from the low speed clock supply unit and the high speed clock output from the high speed clock supply unit;

a control unit which controls the selection of the clock by the selection unit; and a sleep control unit which allows a plurality of circuits, whose clocks are to be switched-over from the low speed clock to the high speed clock, to go into a sleep state, one by one or in batches of two or more, when the selection unit selects and outputs the high speed clock to the circuits and thereafter allows the circuits to go into a normal state.

10. A clock control circuit, comprising:

a low speed clock supply unit which outputs a low speed clock;

a high speed clock supply unit which outputs a high speed clock whose frequency is higher than the low speed clock;

a selection unit which selects and outputs one of the low speed clock output from the low speed clock supply unit and the high speed clock output from the high speed clock supply unit;

a control unit which controls the selection of the clock by the selection unit;

a dividing unit which divides the high speed clock, selected and output from the selection unit in accordance with a dividing ratio;

a dividing ratio set unit which sets the dividing ratio of the dividing unit so that a clock, which is supplied by the dividing unit to a circuit whose clock is to be switched from the low speed clock to the high speed clock, becomes faster gradationally; and a sleep control unit which allows the circuit to go into a sleep state every time the dividing unit outputs a clock with a different dividing ratio to the circuit, just after the clock with the different dividing ratio is output, and thereafter allows the circuit to go into a normal state.

11. A clock control method, comprising:

allowing at least one circuit, to which a clock is supplied, to go into a sleep state;

switching the clock, to be supplied to the circuit in the sleep state, to a faster clock; and allowing the circuit, whose clock has been switched-over to the faster clock, to go into a normal state.

12. The clock control method according to claim 11, wherein when there exists a plurality of the circuits whose clocks are to be switched-over, the plurality of the circuits, which have been allowed to go into the sleep state when the clock is switched into the faster clock, are allowed to go into the normal state at respective, different times.

13. A clock control method, comprising:

switching a clock, to be supplied to at least one circuit whose clock is to be switched-over to a clock faster than a current clock, to the faster clock;

allowing the at least one circuit, whose clock has been switched-over to the faster clock, to go into a sleep state; and allowing the at least one circuit, in the sleep state, to go into a normal state.

14. The clock control method according to claim 13, wherein, when there exists a plurality of circuits whose clocks are to be switched-over, at least one of the plurality of circuits, which have been allowed to go into the sleep state when the clock is switched to the faster clock, is allowed to go into the normal state at respective, different times.

15. A clock control method, comprising:

supplying a clock, faster than a current clock, to at least one circuit whose clock is to be switched to the faster clock and simultaneously allowing the at least one circuit to go into a sleep state; and allowing the at least one circuit, in the sleep state, to go into a normal state.

16. The clock control method according to claim 15, wherein, when there exists a plurality of circuits whose clocks are to be switched-over, at least some of the plurality of circuits, which have been allowed to go into the sleep state when the at least one clock is switched to the faster clock, are allowed to go into the normal state at respective, different times.

17. A clock control method, comprising:

allowing at least one circuit, whose clock is to be switched to a clock faster than a current clock, to go into a sleep state;

switching a clock, to be supplied to the at least one circuit in the sleep state, to the faster clock; and allowing the at least one circuit, whose clock has been switched to the faster clock, to go into a normal state, wherein the sequence of allowing, switching and allowing is executed individually for the at least one circuit or collectively for plural such circuits.

18. A clock control method, comprising:

switching a clock, to be supplied to at least one circuit whose clock is to be switched to a clock faster than a current clock;

allowing the at least one circuit, whose clock has been switched to the faster clock, to go into a sleep state; and allowing the at least one circuit, in the sleep state, to go into a normal state, wherein the sequence of allowing, switching and allowing is executed individually for the at least one circuit or collectively for plural such circuits.

19. A clock control method, comprising:

supplying a clock faster than a current clock to at least one circuit, whose clock is to be switched to the faster clock, and simultaneously allowing the at least one circuit to go into a sleep state; and allowing the at least one circuit in the sleep state to go into a normal state, wherein the sequence of allowing, switching and allowing is executed individually for the at least one circuit or collectively for plural such circuits.

20. A clock control method, comprising outputting and supplying a first clock to a circuit whose clock is to be switched-over to a clock faster than a current clock, wherein, as the first clock becomes faster, after the other circuit is allowed to go into a sleep state just after the fast clock is output, the other circuit is allowed to into a normal state.

* * * * *